(12) United States Patent
Grotelueschen et al.

(10) Patent No.: US 10,035,451 B2
(45) Date of Patent: Jul. 31, 2018

(54) AGRICULTURAL APPLICATOR ATTACHMENT SYSTEM

(71) Applicant: CNH Industrial America LLC, New Holland, PA (US)

(72) Inventors: Nathan Grotelueschen, Spicer, MN (US); Martin Krohn, DeGraff, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/337,580

(22) Filed: Oct. 28, 2016

(65) Prior Publication Data
US 2018/0118082 A1    May 3, 2018

(51) Int. Cl.
*B60P 3/22*    (2006.01)
*B60P 7/08*    (2006.01)

(52) U.S. Cl.
CPC ........... *B60P 3/2215* (2013.01); *B60P 7/0807* (2013.01)

(58) Field of Classification Search
CPC .................................................... B60P 3/2215
See application file for complete search history.

(56) References Cited

U.S. PATENT DOCUMENTS

| 2,711,679 | A  | 6/1955  | Kuhary et al. |
| 4,529,129 | A  | 7/1985  | Ballu         |
| 4,561,591 | A  | 12/1985 | Ballu         |
| 4,646,972 | A  | 3/1987  | McGregor      |
| 4,929,143 | A  | 5/1990  | Dohnalik      |
| 5,222,614 | A  | 6/1993  | Ballu         |
| 6,138,770 | A  | 10/2000 | Kayser        |
| 6,827,155 | B1 | 12/2004 | Hoffart       |
| 6,907,941 | B1 | 6/2005  | Hoffart       |
| 7,249,448 | B2 | 7/2007  | Murphy et al. |
| 8,430,139 | B2 | 4/2013  | Pell et al.   |
| 8,998,106 | B2 | 4/2015  | Joris         |
| 2004/0195356 | A1 | 10/2004 | Ellsworth   |
| 2006/0201075 | A1 | 9/2006  | Rivas et al. |
| 2011/0215169 | A1 | 9/2011  | Denton       |

FOREIGN PATENT DOCUMENTS

| DE | 10349320 A1 | 5/2005  |
| EP | 0572091 A1  | 12/1993 |
| EP | 0981941 A1  | 3/2000  |
| EP | 1525795 A1  | 4/2005  |

(Continued)

OTHER PUBLICATIONS

Sprayparts.com; Benson Booms; web-site—http://www.sprayparts.com/dealer/SprayParts/default.; pp. 1-2; 2015; US.

(Continued)

*Primary Examiner* — Kevin Hurley
(74) *Attorney, Agent, or Firm* — Rebecca L. Henkel; Rickard K. DeMille

(57) ABSTRACT

A system for agricultural operations is provided in which an applicator may be attached to chassis using a ball and socket configuration. The ball and socket configuration allows for a faster and more convenient way to change between applicators than previously known for such applications. Also, the ball and socket configuration provides a semi-rigid mount which may allow for improved handling of forces between the chassis and the applicator as the chassis traverses through rough agricultural terrain.

19 Claims, 3 Drawing Sheets

(56) References Cited

FOREIGN PATENT DOCUMENTS

| | | |
|---|---|---|
| FR | 2880516 A1 | 7/2006 |
| GB | 708990 A | 5/1954 |
| GB | 1588426 A | 4/1981 |
| GB | 2151891 A | 7/1985 |

OTHER PUBLICATIONS

Nitro 5000 Series Features; mcintoshdistribution.com.au; web-site: www.mcintoshdistribution.com.au/machinery/show/miller-sprayers-australia; pp. 1-11; 2014; US.

AGRICULTURAL APPLICATOR ATTACHMENT SYSTEM

FIELD OF THE INVENTION

The present invention relates generally to agricultural machines, and more particularly, to agricultural machines having a ball and socket configuration which allows an applicator to be detachable from a chassis.

BACKGROUND OF THE INVENTION

Agricultural machines in which an applicator is detachable from a chassis are known. For example, the Titan series floaters provided by CNH Industrial, such as the 3540 and 4540 floaters, provide a self-propelled chassis which may carry a separately detachable applicator. Having the applicator be detachable from the chassis provides several advantages, including most notably the ability to change agricultural operations while using the same vehicle. Examples of applicators which may be changed include storage tanks with sprayers, air boxes for distributing granular particles, and spinners for distributing granular particles.

In such arrangements, applicators are typically mounted to chasses either rigidly or semi-rigidly. Rigid mounts typically consist of a direct bolting which does not allow the applicator to move or flex independently from the chassis. Semi-rigid mounts typically consist of a bolt and spring arrangement which may allow limited movement or flex independently from the chassis. Whether rigid or semi-rigid, these types of mounts do not lend themselves to changing from one applicator to the next as quickly or easily as may be desired with certain types of chassis.

SUMMARY OF THE INVENTION

The present invention provides an agricultural applicator attachment system in which an applicator may be attached to a chassis using a ball and socket configuration. The ball and socket configuration allows for a faster and more convenient way to change between applicators than previously known for such applications. Also, the ball and socket configuration provides a semi-rigid mount which may allow for improved handling of forces between the chassis and the applicator as the chassis traverses through rough agricultural terrain.

In one aspect, one or more ball and socket style mounts may be provided between an applicator and a chassis. Such ball and socket style connection allows the applicator to be mounted to the chassis in a semi-rigid manner. This allows the chassis to flex and twist as it interacts with the terrain it is passing over while minimizing the stresses introduced to the applicator. The ball and socket style mount may be implemented so that the connection can be rapidly secured or unsecured. Accordingly, in one aspect, a ball and socket joint may be provided to create a quick connection between the applicator and the chassis.

The ball and socket style mount may allow for relative motion between the chassis and the applicator while transferring minimal stress from the chassis into the applicator. The ball and socket style mount also allows for the connection between the chassis and the applicator to be connected or disconnected quickly. In order to secure the ball in the socket a simple moveable plate (or latch) may be pivoted into a locked position, trapping the ball in the socket. In a similar manner, the moveable plate can be unlocked and pivoted to allow the ball to pass through the opening. Managing this joint can be done with or without a tool, such as a wrench. Being able to manage this joint without tools and/or loose hardware may significantly reduce the amount of time required to change between two different applicators.

Aspects of the invention may accomplish one or more of: minimizing the amount of time required to change between two different applicators; minimizing the amount of stress transferred from the chassis to the applicator; and/or allowing an operator to manage the joint between the chassis and the applicator without tools and/or loose hardware. In an alternative aspect, a pin and latch joint (similar to a fifth wheel attachment between a semi-tractor and trailer) may be used.

Specifically then, in one aspect, a self-propelled agricultural machine may be provided. The self-propelled agricultural machine may include a chassis assembly having: a frame supported by multiple wheels; an operator cab supported by the frame; an engine supported by the frame; and multiple coupler balls mounted to the frame. The self-propelled agricultural machine may also include a detachable agricultural applicator assembly including multiple sockets, each socket being configured to receive a coupler ball, and each socket including a locking assembly. The sockets may be configured to lock the coupler balls to the detachable agricultural applicator assembly by moving the locking assembly into a first position operable to trap the coupler balls. The sockets may also be configured to release the coupler balls from the detachable agricultural applicator assembly by moving the locking assembly into a second position operable to release the coupler balls.

Another aspect may provide a self-propelled agricultural machine including: a chassis assembly having: a frame supported by multiple wheels; an operator cab supported by the frame; an engine supported by the frame; and first, second and third coupler balls mounted to the frame; and a detachable agricultural applicator assembly including first, second and third sockets, each socket being configured to receive a coupler ball, and each socket including a locking assembly. The first, second and third sockets may be configured to lock the first, second and third coupler balls, respectively, to the detachable agricultural applicator assembly by moving the locking assembly into a first position operable to trap the first, second and third coupler balls. The first, second and third sockets may be configured to release the first, second and third coupler balls, respectively, from the detachable agricultural applicator assembly by moving the locking assembly into a second position operable to release the first, second and third coupler balls.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

A wide variety of agricultural machines could be constructed in accordance with the invention defined by the claims. Hence, while preferred embodiments of a ball and socket joint configuration of an agricultural applicator attachment system with a coupler ball(s) receivable in a socket(s) are provided in accordance with an aspect of the invention, including with respect to a three-wheeled agricultural vehicle by way of example, it should be understood that the invention is in no way so limited.

Figure 1:
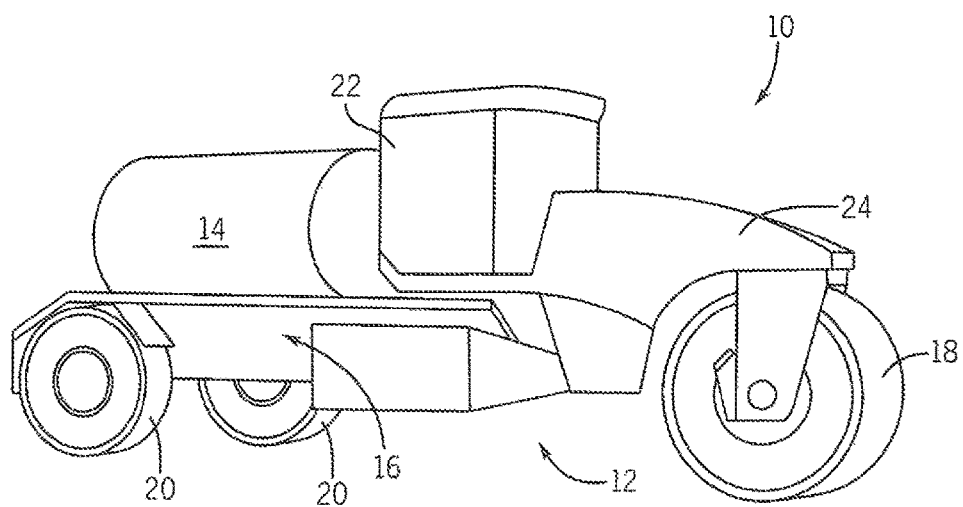
FIG. 1 is a pictorial view of a self-propelled agricultural machine having a chassis assembly and a detachable agricultural applicator assembly in accordance with an aspect of the present invention.

Referring generally to the drawings, and more particularly to FIG. 1, an exemplar self-propelled agricultural machine 10 is provided, which includes an agricultural applicator attachment system configured to attach an applicator assembly to a chassis of the agricultural machine 10, as explained in greater detail elsewhere herein. The self-propelled agricultural machine 10 may be, for example, a three wheel "floater" as shown, or may be another type of agricultural machine having a differing number of wheels such as a four wheel floater or a four wheel high-clearance application or other machine. The agricultural machine 10 may be used, for example, to apply crop nutrients to soils, which may typically be done before planting in the spring and/or after harvest in the fall. However, it will be appreciated that in alternative arrangements, the agricultural machine 10 may be configured to accomplish numerous varying agricultural tasks as desired, carrying loads up to 14,000 pounds and greater, through rough terrain and/or mud.

The agricultural machine 10 generally includes a chassis assembly 12 and a detachable agricultural applicator assembly 14 connected by the agricultural applicator attachment system. The chassis assembly 12 may have a frame 16 supported by one or more front wheels 18 and one or more rear wheels 20. The frame 16 may support an operator cab 22 providing operator seating, controls and display, and an engine 24, brake and drive system. Accordingly, the chassis assembly 12 may be a self-propelled agricultural vehicle.

Figure 2:
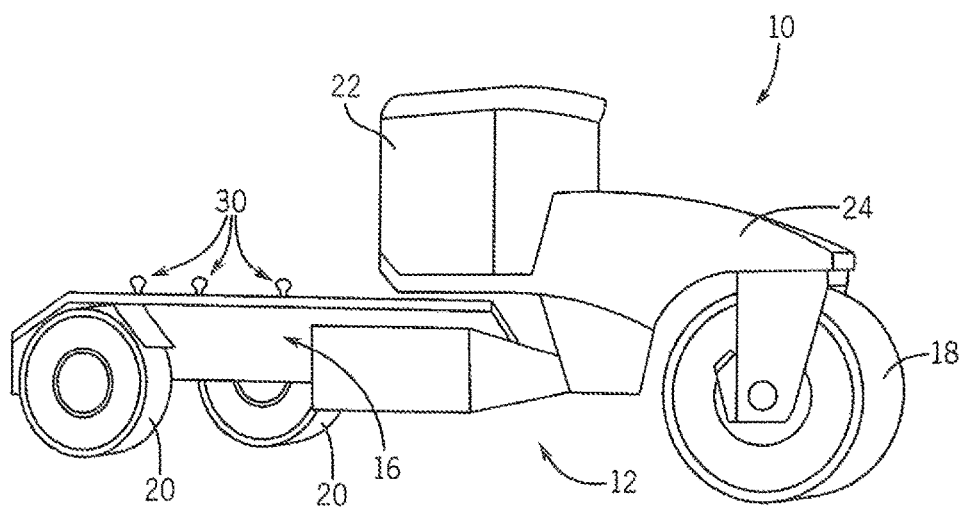
FIG. 2 is a pictorial view of the self-propelled agricultural machine of FIG. 1 without the detachable agricultural applicator assembly.

Referring also to FIG. 2, a pictorial view of the agricultural machine 10 is provided in which the detachable agricultural applicator assembly 14 has been removed. The detachable agricultural applicator assembly 14 may be removed, for example, by decoupling coupler balls 30 of the agricultural applicator attachment system from respective sockets provided by the detachable agricultural applicator assembly 14. Upon decoupling the coupler balls 30, the detachable agricultural applicator assembly 14 may be removed, for example, by being hoisted by a crane or other suitable hardware and moved away from the chassis assembly 12, thereby allowing a different detachable agricultural applicator assembly 14 (perhaps serving a different agricultural purpose) to be attached. The detachable agricultural applicator assembly 14 may be rear mounted on the chassis assembly 12, though other configurations are possible.

Figure 3:
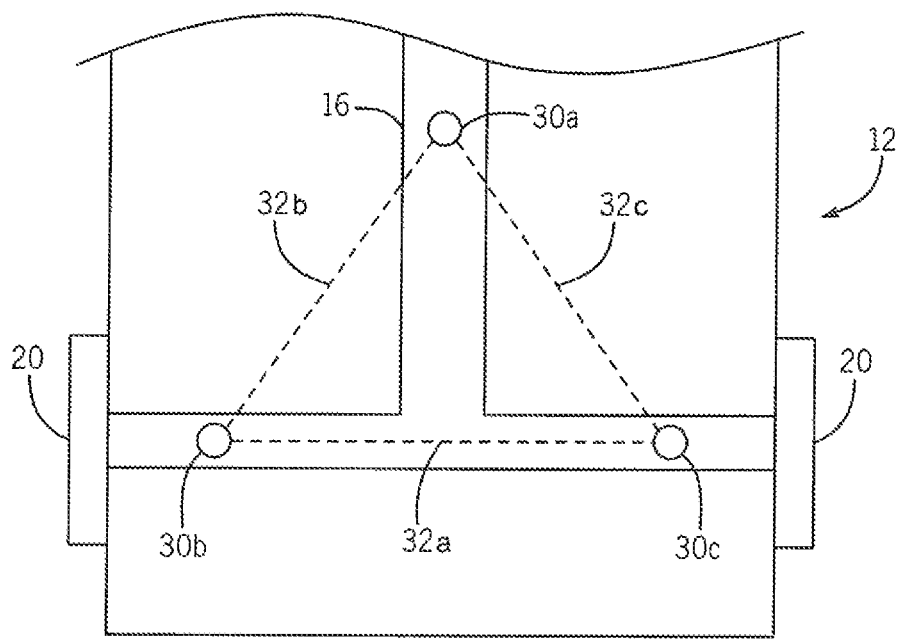
FIG. 3 is a plan view of a portion of the chassis assembly of FIG. 1 illustrating multiple coupler balls mounted to the frame.

Referring now to FIG. 3, a plan view of a portion of the chassis assembly 12 of FIG. 1 is provided. In one aspect, first, second and third coupler balls 30a, 30b and 30c, respectively, may be mounted to portions of the frame 16 in a common plane in a rear portion of the agricultural machine 10. The first, second and third coupler balls 30a, 30b and 30c, respectively, may optimally permit defining three distinct connection points in a geometric plan while also using the fewest components. The first, second and third coupler balls 30a, 30b and 30c, respectively, may each be spaced apart by first, second and third distances 32a, 32b and 32c, respectively. Accordingly, the first distance 32a may correspond to a distance between the second and third couplers 30b and 30c, respectively; the second distance 32b may correspond to a distance between the first and second couplers 30a and 30b, respectively; and the third distance 32c may correspond to a distance between the first and third couplers 30a and 30c, respectively. In one aspect, such as to spread out the mounting points, distribute the load and associated forces, and/or stabilize the applicator, the first, second and third distances 32a, 32b and 32c, respectively, may be unequal distances, such as the first distance 32a being shorter than the second and third distances 32b and 32c, respectively, However, in another aspect, such as to distribute flex and twist forces among the ball and socket joints substantially equally, the first, second and third distances 32a, 32b and 32c, respectively, may be substantially equal. It will be appreciated that a varying number of ball and socket joints and configurations thereof may be used, and that such ball and socket joints may be distributed optimally to accommodate the widest variety of detachable agricultural applicator assembly 14 types.

Figure 4:
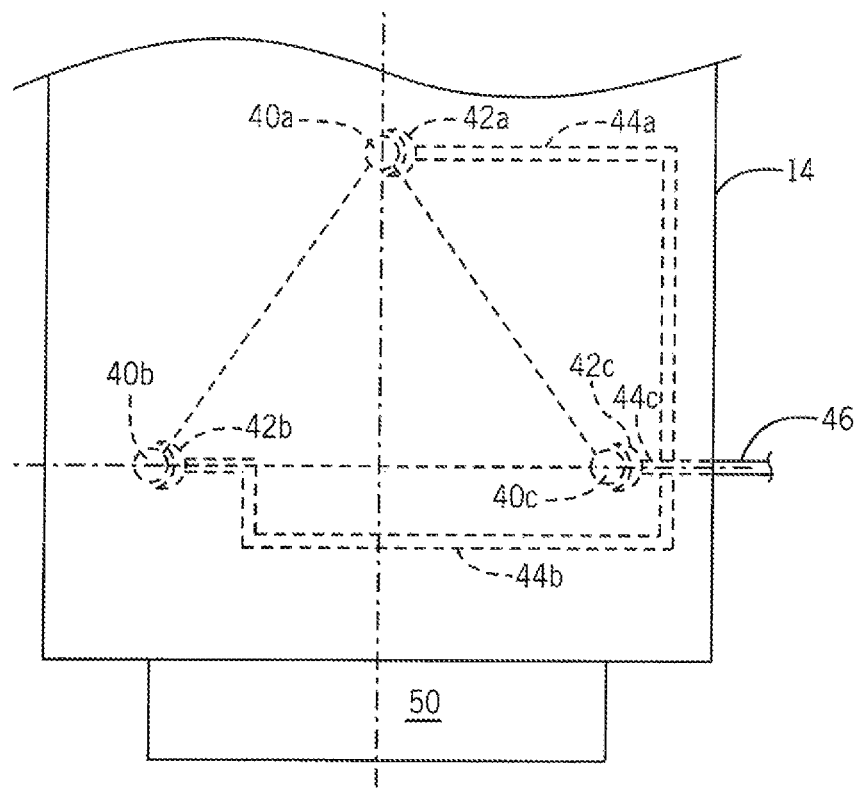
FIG. 4 is a cutaway plan view of a portion of the detachable agricultural applicator assembly of FIG. 1 illustrating multiple sockets configured to receive the coupler balls.

Referring now to FIG. 4, a cutaway plan view of a portion of a detachable agricultural applicator assembly 14 is provided. The detachable agricultural applicator assembly 14 may include multiple sockets 40 of the agricultural applicator attachment system, such as first, second and third sockets 40a, 40b and 40c, respectively. Each socket 40 may be configured to receive a coupler ball 30 for establishing a coupling connection. For example, the first, second and third sockets 40a, 40b and 40c may be configured to receive the first, second and third coupler balls 30a. 30b and 30c, respectively, upon lowering the detachable agricultural applicator assembly 14 onto the chassis assembly 12.

Figure 5:
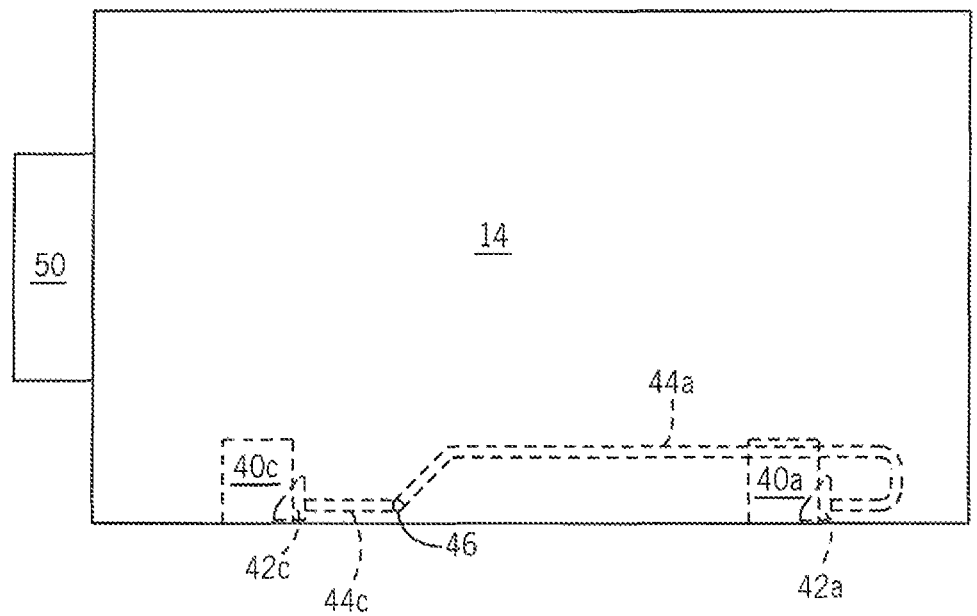
FIG. 5 is a cutaway side view of the detachable agricultural applicator assembly of FIG. 4.

With additional reference to FIG. 5, providing a cutaway side view of the detachable agricultural applicator assembly 14, each socket 40 may include a locking assembly for retaining a coupler ball 30. For example, the first, second and third sockets 40a, 40b and 40c may include locking assemblies consisting of first, second and third plates 42a, 43b and 42c in communication with first, second and third arms 44a, 44b and 44c, respectively, for controlling the plates. Accordingly, the sockets 40 may lock the coupler balls 30 to the detachable agricultural applicator assembly 14 by moving the locking assembly (pivoting plates 42 inward via movement of arms 44) into a first position operable to trap the coupler balls 30 in the respective sockets 40. Conversely, the sockets 40 may release the coupler balls 30 from the detachable agricultural applicator assembly 14 by moving the locking assembly (pivoting plates 42 outward via movement of arms 44) into a second position (as shown), operable to release the coupler balls 30 from the respective sockets 40. In one aspect, the coupling configuration may operate similarly to a "goose-neck" ball and socket joint arrangement. The arms 44 may be actuated, for example, by an operator engaging and rotating a grip or port 46. In some aspects, an operator may employ a wrench or other tool for achieving even greater torque for actuating the locking assembly. Also, in one aspect, the first, second and third arms 44a, 44b and 44c may each be in communication with one another to allow the first, second and third plates 42a, 43b and 42c, respectively, of each locking assembly to pivot upon a single movement of the grip or port 46. Alternatively, the first, second and third arms 44a, 44b and 44c may move separately upon movement of separate grips or ports.

The detachable agricultural applicator assembly 14 may be configured to accomplish a specific agricultural function, including via an implement 50. For example, in one configuration, the detachable agricultural applicator assembly 14 may include a liquid storage tank or bin and the implement 50 may provide booms and nozzles for a sprayer and an application system. In another configuration, the detachable agricultural applicator assembly 14 may include a granular particle storage tank or bin and the implement 50 may provide an air box for distributing granular particles. In yet another configuration, the detachable agricultural applicator assembly 14 may include a granular particle storage tank or bin and the implement 50 may provide one or more spinner disks for distributing granular particles. It will be appreciated that a wide variety of agricultural functions may be accomplished with detachable agricultural applicator assembly 14 types within the scope of the invention.

Figure 6:
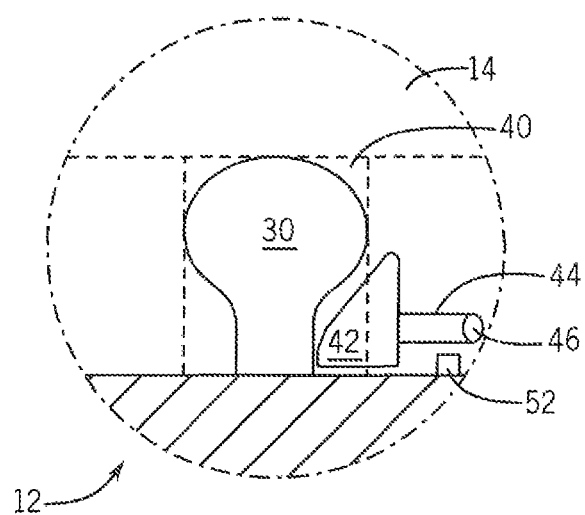
FIG. 6 is a cutaway detailed view of an exemplar socket receiving a coupler ball, and a locking assembly operating to trap the coupler ball, in accordance with an aspect of the present invention.

Referring now to FIG. 6, a cutaway detailed view of an exemplar socket 40 receiving a coupler ball 30, and a locking assembly operating to trap the coupler ball 30, is provided in accordance with an aspect of the present invention. Illustrated in the first (locked) position, after the socket 40 receives the coupler ball 30, the plate 42 may be pivoted inward, into the socket 40, below a portion of a coupler ball 30. The plate 42 may be pivoted inward by movement of the arm 44 provided, in turn, by the grip or port 46. Accordingly, the socket 40 may trap the coupler ball 30 in order to lock the detachable agricultural applicator assembly 14 to the chassis assembly 12.

However, in a second position (see also FIG. 4), the plate 42 may be pivoted outward, from the socket 40, away from the coupler ball 30. The plate 42 may be pivoted outward by movement of the arm 44 (in an opposite direction). Accordingly, the socket 40 may release the coupler ball 30 in order to release the detachable agricultural applicator assembly 14 from the chassis assembly 12. In one aspect, movement of the arm 44 may be automatically provided by hydraulic action or other machinery.

In some aspects, an electronic sensor 52 may be provided with respect to one or more of the sockets 40. The sensor 52 may be configured to detect either position of the locking assembly, such as the first (locked) position or the second (unlocked) position. The sensor 52 could be, for example, a Hall effect sensor operable to generate an electrical signal in response to detection of a magnetic field. For example, in operation, the plate 42, or a portion thereof that is metallic, may be nearby the sensor 52 (and the plate 42 therefore being outside of the socket 40), thereby causing the sensor 52 to trigger an electrical signal indicating the locking assembly is in the second (unlocked) position. Similarly, the sensor 52 may fail to detect the presence of the plate 42 nearby the sensor 52 (and the plate 42 therefore being partially inside the socket 40), thereby removing the electrical signal to indicate the locking assembly is in the first (locked) position. The electrical signal may be received in the operator cab 22 and displayed to the operator with the correct state, such as an LED illuminating to indicate "unlocked" when the second position is detected, accordingly.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept. For example, a pin and latch joint (similar to a fifth wheel attachment between a semi-tractor and trailer) may be used. Also, one or more ball and socket joints may instead be provided with the one or more coupler balls on the detachable agricultural applicator assembly, with opposing sockets provided on the chassis assembly. Such variations are deemed within the scope of the invention.

What is claimed is:

1. A self-propelled agricultural machine comprising:
a chassis assembly having:
a frame supported by a plurality of wheels;
an operator cab supported by the frame;
an engine supported by the frame; and
a plurality of coupler balls mounted to the frame; and
a detachable agricultural applicator assembly including a plurality of sockets, each socket being configured to receive a coupler ball, and each socket including a locking assembly,
wherein the sockets are configured to lock the coupler balls to the detachable agricultural applicator assembly by moving the locking assembly into a first position operable to trap the coupler balls, and
wherein the sockets are configured to release the coupler balls from the detachable agricultural applicator assembly by moving the locking assembly into a second position operable to release the coupler balls.

2. The self-propelled agricultural machine of claim 1, wherein the chassis assembly provides at least three coupler balls.

3. The self-propelled agricultural machine of claim 1, wherein the coupler balls are spaced apart by unequal distances.

4. The self-propelled agricultural machine of claim 1, wherein each locking assembly includes a plate configured to pivot below a portion of a coupler ball in the first position.

5. The self-propelled agricultural machine of claim 4, wherein each locking assembly further includes an arm in communication with the plate, wherein each plate is configured to pivot upon movement of the arm.

6. The self-propelled agricultural machine of claim 5, wherein arms of each locking assembly are in communication with one another to allow plates of each locking assembly to pivot upon a single movement.

7. The self-propelled agricultural machine of claim 1, wherein each locking assembly includes a sensor operable to detect at least one of the first and second positions.

8. The self-propelled agricultural machine of claim 1, wherein the detachable agricultural applicator assembly includes at least one of a storage tank, a sprayer and an application system.

9. The self-propelled agricultural machine of claim 1, wherein the detachable agricultural applicator includes at least one storage tank and an air application system for distributing granular particles.

10. The self-propelled agricultural machine of claim 1, wherein the detachable agricultural applicator assembly includes at least one storage tank and a spinner for distributing granular particles.

11. A self-propelled agricultural machine comprising:
a chassis assembly having:
a frame supported by a plurality of wheels;
an operator cab supported by the frame;
an engine supported by the frame; and
first, second and third coupler balls mounted to the frame; and
a detachable agricultural applicator assembly including first, second and third sockets, each socket being configured to receive a coupler ball, and each socket including a locking assembly,
wherein the first, second and third sockets are configured to lock the first, second and third coupler balls, respectively, to the detachable agricultural applicator assembly by moving the locking assembly into a first position operable to trap the first, second and third coupler balls, and
wherein the first, second and third sockets are configured to release the first, second and third coupler balls, respectively, from the detachable agricultural applicator assembly by moving the locking assembly into a second position operable to release the first, second and third coupler balls.

12. The self-propelled agricultural machine of claim 11, wherein the first, second and third coupler balls are spaced apart by unequal distances.

13. The self-propelled agricultural machine of claim 11, wherein each locking assembly includes a plate configured to pivot below a portion of a coupler ball in the first position.

14. The self-propelled agricultural machine of claim 13, wherein each locking assembly further includes an arm in communication with the plate, wherein each plate is configured to pivot upon movement of the arm.

15. The self-propelled agricultural machine of claim 14, wherein arms of each locking assembly are in communication with one another to allow plates of each locking assembly to pivot upon a single movement.

16. The self-propelled agricultural machine of claim 11, wherein each locking assembly includes a sensor operable to detect at least one of the first and second positions.

17. A self-propelled agricultural machine comprising:
a detachable agricultural applicator assembly including a plurality of coupler balls; and
a chassis assembly having:
a frame supported by a plurality of wheels;
an operator cab supported by the frame;
an engine supported by the frame; and
a plurality of sockets in the frame,
wherein each socket is configured to receive a coupler ball, and each socket includes a locking assembly,
wherein the sockets are configured to lock the coupler balls to the chassis assembly by moving the locking assembly into a first position operable to trap the coupler balls, and
wherein the sockets are configured to release the coupler balls from the chassis assembly by moving the locking assembly into a second position operable to release the coupler balls.

18. The self-propelled agricultural machine of claim 17, wherein the detachable agricultural applicator assembly provides at least three coupler balls.

19. The self-propelled agricultural machine of claim 17, wherein the coupler balls are spaced apart by unequal distances.

* * * * *